(12) United States Patent
Ichiyoshi

(10) Patent No.: US 11,194,734 B2
(45) Date of Patent: Dec. 7, 2021

(54) PACKET PROCESSING DEVICE, PACKET PROCESSING METHOD, AND RECORDING MEDIUM

(71) Applicant: NEC Corporation, Tokyo (JP)

(72) Inventor: Shuzo Ichiyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 16/305,118

(22) PCT Filed: Jun. 5, 2017

(86) PCT No.: PCT/JP2017/020755
§ 371 (c)(1),
(2) Date: Nov. 28, 2018

(87) PCT Pub. No.: WO2017/213067
PCT Pub. Date: Dec. 14, 2017

(65) Prior Publication Data
US 2020/0327067 A1    Oct. 15, 2020

(30) Foreign Application Priority Data
Jun. 8, 2016   (JP) .............................. JP2016-114381

(51) Int. Cl.
*G06F 9/46* (2006.01)
*G06F 12/1027* (2016.01)
(Continued)

(52) U.S. Cl.
CPC .......... *G06F 12/1027* (2013.01); *G06F 9/485* (2013.01); *G06F 9/4843* (2013.01);
(Continued)

(58) Field of Classification Search
CPC ...... G06F 9/4843; G06F 9/485; G06F 9/4881; G06F 9/5088; G06F 13/4022; G06F 13/404
See application file for complete search history.

(56) References Cited

U.S. PATENT DOCUMENTS 6,389,468 B1    5/2002   Muller et al.
2002/0150114 A1*  10/2002   Sainomoto .............. H04L 45/50
370/402

(Continued)

FOREIGN PATENT DOCUMENTS

| JP | 2002-538724 A | 11/2002 |
| JP | 2015-146598 A | 8/2015 |
| WO | 2012/105677 A1 | 8/2012 |

OTHER PUBLICATIONS

International Search Report for PCT Application No. PCT/JP2017/020755, dated Aug. 15, 2017.

(Continued)

*Primary Examiner* — Diem K Cao
(74) *Attorney, Agent, or Firm* — Sughrue Mion, PLLC

(57) ABSTRACT

In order to achieve a packet processing device which make it possible to process a packet at high speed, a bus that transfers a communication packet, and a plurality of processors and executes at least one task including either of a first task and a second task are included, wherein the first task performs processing when a first task identifier given to the first task and a second task identifier added to the communication packet received from the bus coincide with each other, the second task performs the processing for the communication packet that is not added with the second task identifier, and the processing executes first processing, based on the packet identifier, and thereafter, adds, to the communication packet, the second task identifier indicating the different first task that executes second processing subse- (Continued)

quent to the first processing, and transmits the communication packet to the bus.

15 Claims, 9 Drawing Sheets

(51) Int. Cl.
    *G06F 9/48*     (2006.01)
    *G06F 12/0813*     (2016.01)
    *G06F 13/40*     (2006.01)
    *G06F 9/50*     (2006.01)

(52) U.S. Cl.
    CPC .......... *G06F 9/4881* (2013.01); *G06F 9/5027* (2013.01); *G06F 9/5088* (2013.01); *G06F 12/0813* (2013.01); *G06F 13/404* (2013.01); *G06F 13/4022* (2013.01); *G06F 2212/682* (2013.01)

(56) References Cited

U.S. PATENT DOCUMENTS

| | | | |
|---|---|---|---|
| 2013/0121209 A1 | 5/2013 | Padmanabhan et al. | |
| 2014/0344826 A1* | 11/2014 | Wu | G06F 9/4843 718/104 |
| 2017/0132035 A1* | 5/2017 | Hsieh | G06F 3/0659 |
| 2017/0331749 A1* | 11/2017 | Zhang | H04L 67/16 |

OTHER PUBLICATIONS

English translation of Written opinion for PCT Application No. PCT/JP2017/020755.

\* cited by examiner

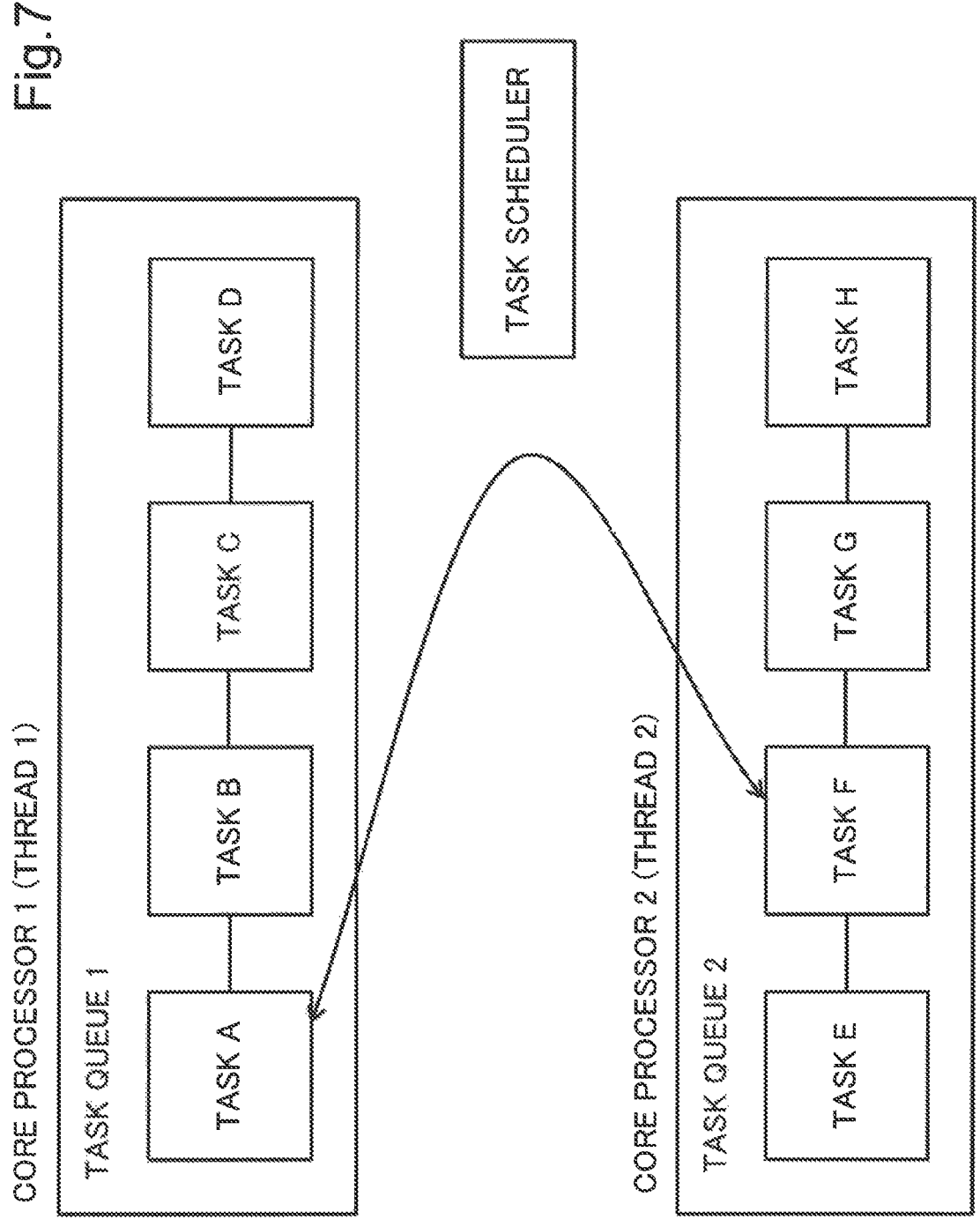

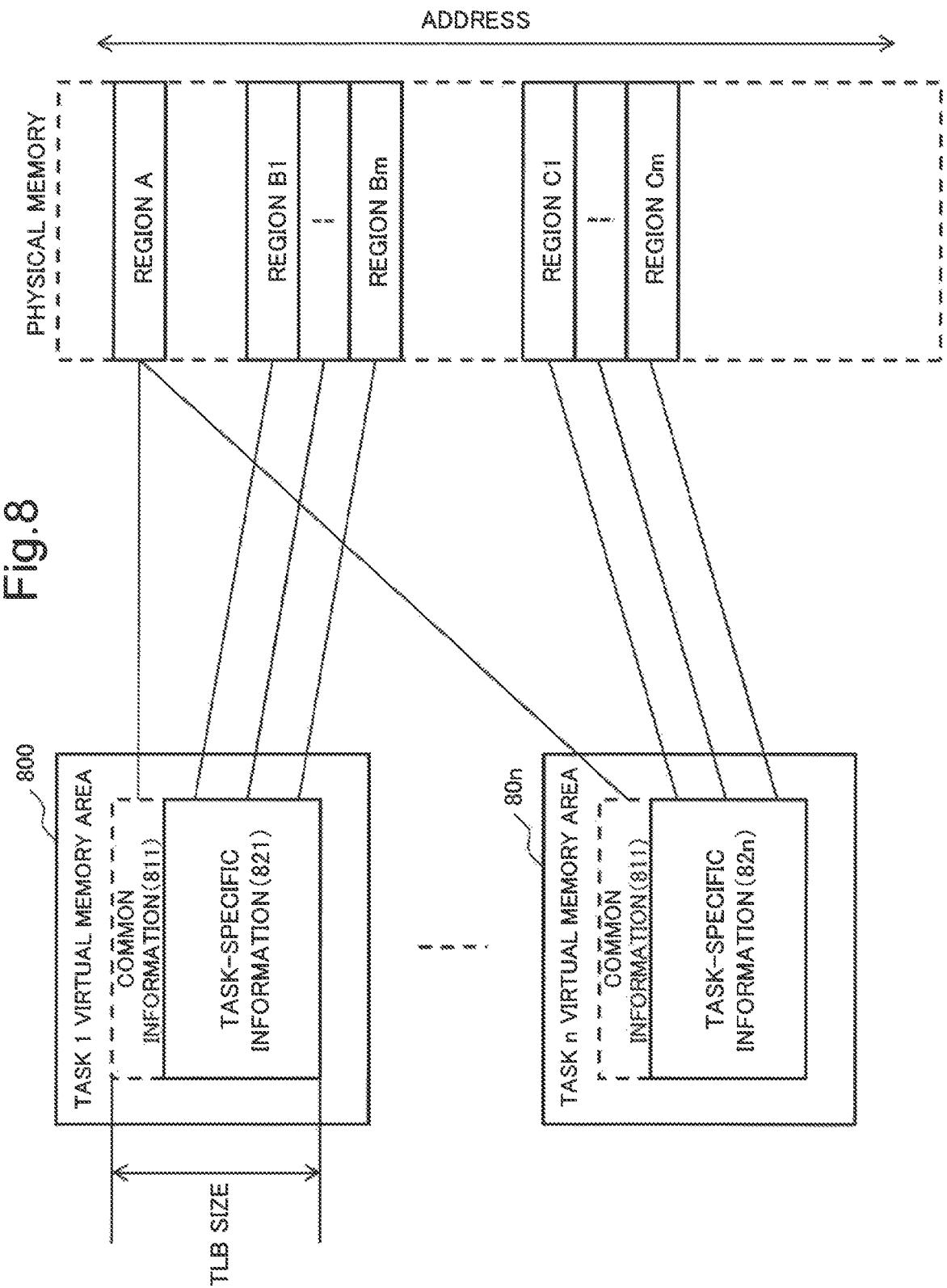

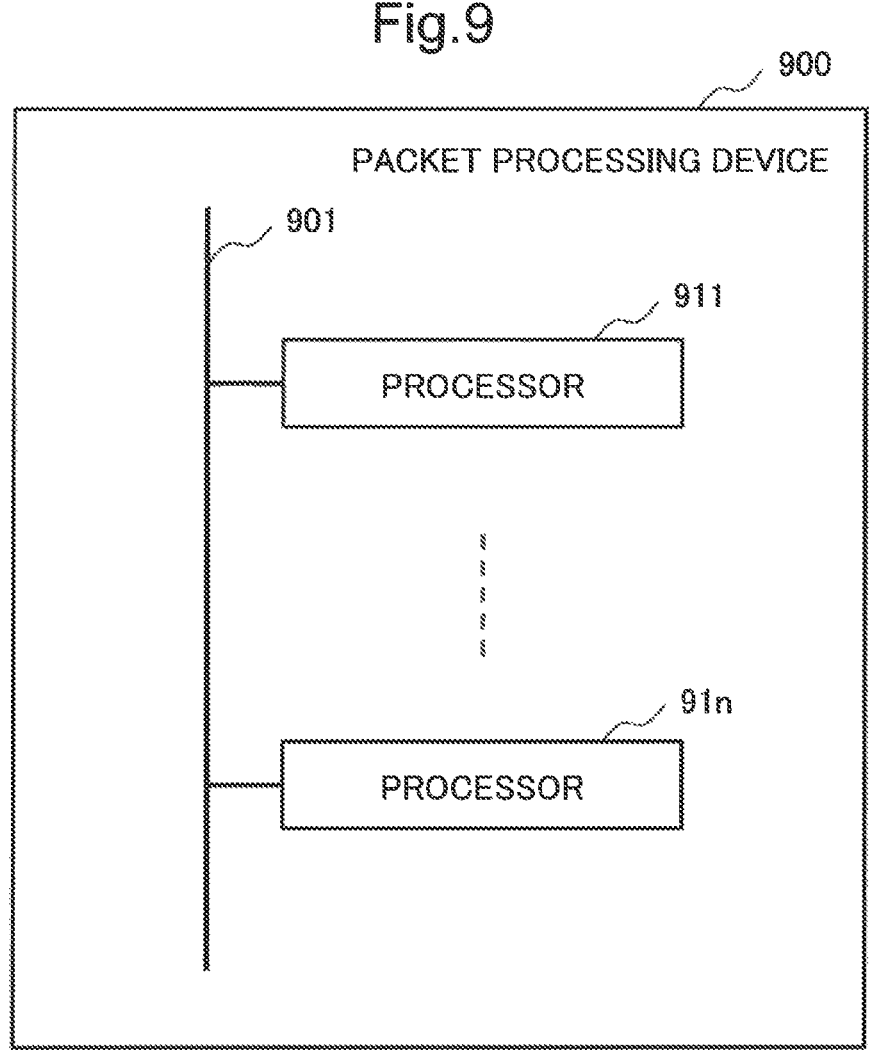

PACKET PROCESSING DEVICE, PACKET PROCESSING METHOD, AND RECORDING MEDIUM

This application is a National Stage Entry of PCT/JP2017/020755 filed on Jun. 5, 2017, which claims priority from Japanese Patent Application 2016-114381 filed on Jun. 8, 2016, the contents of all of which are incorporated herein by reference, in their entirety.

TECHNICAL FIELD

The present invention relates to a packet processing device, a packet processing method, and a program.

BACKGROUND ART

While a software-defined network (SDN) has attracted attention, a network device of a data plane, which was implemented by hardware, has now been implemented by a general-purpose server.

In these days, the general-purpose server is provided with higher performance realized by an increase of the number of central processing unit (CPU) cores and with a memory having a large capacity. Furthermore, there is presented a development environment provided with a program architecture utilizing a resource of the general-purpose server in order to replace the hardware.

For example, there is offered an Intel (registered trademark) data plane development kit (DPDK) configured to optimize packet processing on an Intel architecture processor.

Moreover, an efficient packet processing method in a multi processor is disclosed.

For example, in PTL 1, on the basis of header information of a packet to be processed, a processor that processes the packet is determined from a plurality of processors uniquely by arithmetic operation, and processing processors are distributed.

Moreover, in PTL 2, a plurality of processors are set to a processor distribution rule, and a processor is selected at the time of processing, thereby processing processors are distributed.

CITATION LIST

Patent Literature

[PTL 1] Japanese Unexamined Patent Application Publication (Translation of PCT Application) No. 2002-538724
[PTL 2] International Publication WO2012/105677

SUMMARY OF INVENTION

Technical Problem

However, a packet processing device described in PTL 1 determines a packet processing processor uniquely on the basis of a partial field of a header of the packet. Therefore, when packets having the same partial field of the header are concentrated in a short time, there is a possibility that processing may be concentrated on a specific processor.

Moreover, in a packet processing method described in PTL 2, a plurality of processing processors can be designated according to filter definition, thus making it possible to avoid concentration of processing onto a specific processor.

However, the packet processing method in PTL 2 designates a processing processor for each packet. Then, when a processor is changed during continuous packet processing, a memory region to be referred to by a processor for each packet to be processed by the processor is changed to a different position on a memory. Therefore, in the packet processing method in PTL 2, it takes longer in time to refer to a memory than a case where one processor continuously performs continuous packet processing. Accordingly, even when distribution of processors is changed, it is sometimes difficult to exert an effect of processing acceleration.

An object of a packet processing device, a packet processing method, and a program according to the present invention is to process a packet at high speed.

Solution to Problem

In order to achieve the above-described object, a packet processing device according to the present invention includes: a bus that transfers a communication packet including a packet identifier; and a plurality of processors each of which is connected to the bus and executes at least one task including either of a first task and a second task, wherein the first task performs predetermined processing when a first task identifier given to the first task and a second task identifier added to the communication packet received from the bus coincide with each other, the second task performs the predetermined processing for the communication packet that is not added with the second task identifier, and the predetermined processing executes first processing, based on the packet identifier, and thereafter, adds, to the communication packet, the second task identifier indicating another task that executes second processing subsequent to the first processing, and transmits the communication packet to the bus.

In order to achieve the above-described object, a packet processing method according to the present invention includes causing a plurality of processors connected to a bus that transfers a communication packet including a packet identifier, to execute at least one task including either of a first task and a second task, wherein the first task performs predetermined processing when a first task identifier given to the first task and a second task identifier added to the communication packet received from a bus coincide with each other, the second task performs the predetermined processing for the communication packet that is not added with the second task identifier, and the predetermined processing executes first processing, based on the packet identifier, and thereafter, adds, to the communication packet, the second task identifier indicating another task that executes second processing subsequent to the first processing, and transmits the communication packet to the bus.

In order to achieve the above-described object, a program according to the present invention records a program causing a plurality of processors connected to a bus that transfers a communication packet including a packet identifier, to execute at least one task including either of a first task and a second task, wherein the first task performs predetermined processing when a first task identifier given to the first task and a second task identifier added to the communication packet received from a bus coincide with each other, the second task performs the predetermined processing for the communication packet that is not added with the second task identifier, and the predetermined processing executes first processing, based on the packet identifier, and thereafter, adds, to the communication packet, the second task identifier indicating another task that executes second processing subsequent to the first processing, and transmits the communication packet to the bus.

Advantageous Effects of Invention

According to the present invention, a packet processing device, a packet processing method, and a program make it possible to process a packet at high speed.

BRIEF DESCRIPTION OF DRAWINGS

FIG. 7 is a diagram explaining the operations of the first example embodiment.

FIG. 8 is a diagram explaining the operations of the first example embodiment.

FIG. 9 is a diagram illustrating a configuration example of a second example embodiment.

EXAMPLE EMBODIMENT

First Example Embodiment

Figure 1:
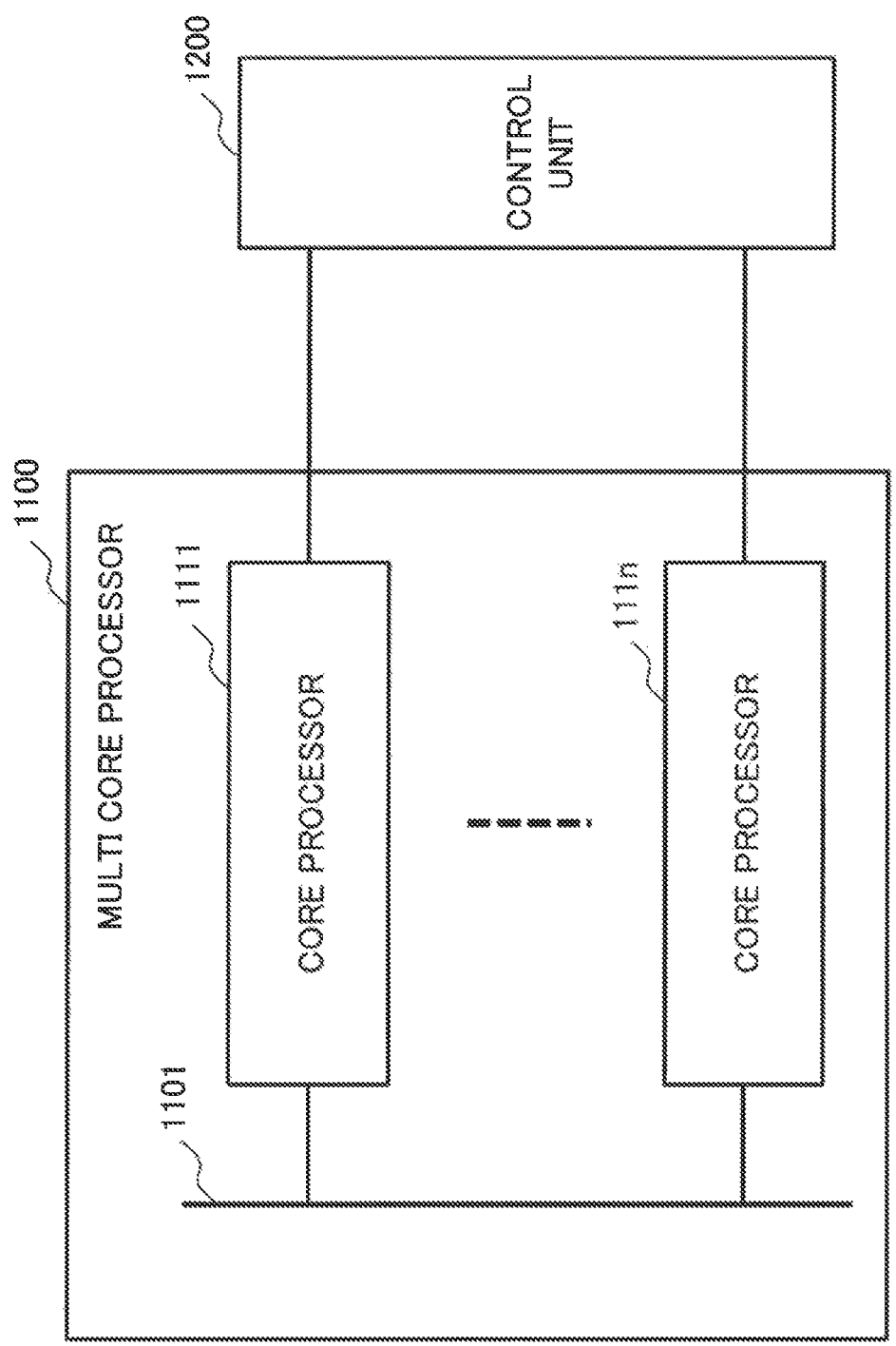
FIG. 1 is a diagram illustrating a configuration example of a first example embodiment.

Next, example embodiments of the present invention will be described in detail with reference to the drawings.
[Description of Configuration]
FIG. 1 illustrates a configuration of a first example embodiment.

A packet processing device 1000 of the present example embodiment includes a multi core processor 1100 and a control unit 1200. Further, the multi core processor 1100 is composed of a core processors 1111 to 111n which are a plurality of central processing units (CPUs) and of a bus 1101. The bus is a signal line through which a packet (also referred to as a communication packet) is transferred. The core processors 1111 to 111n are connected to the bus 1101.

Moreover, the control unit 1200 is connected to the core processors 1111 to 111n and is a control means for the core processors 1111 to 111n that is capable of exchanging, between the core processors, tasks (described later) to be processed by the core processors, and the like.

Next, configuration for processing the packet will be described with reference to FIG. 2.

Figure 2:
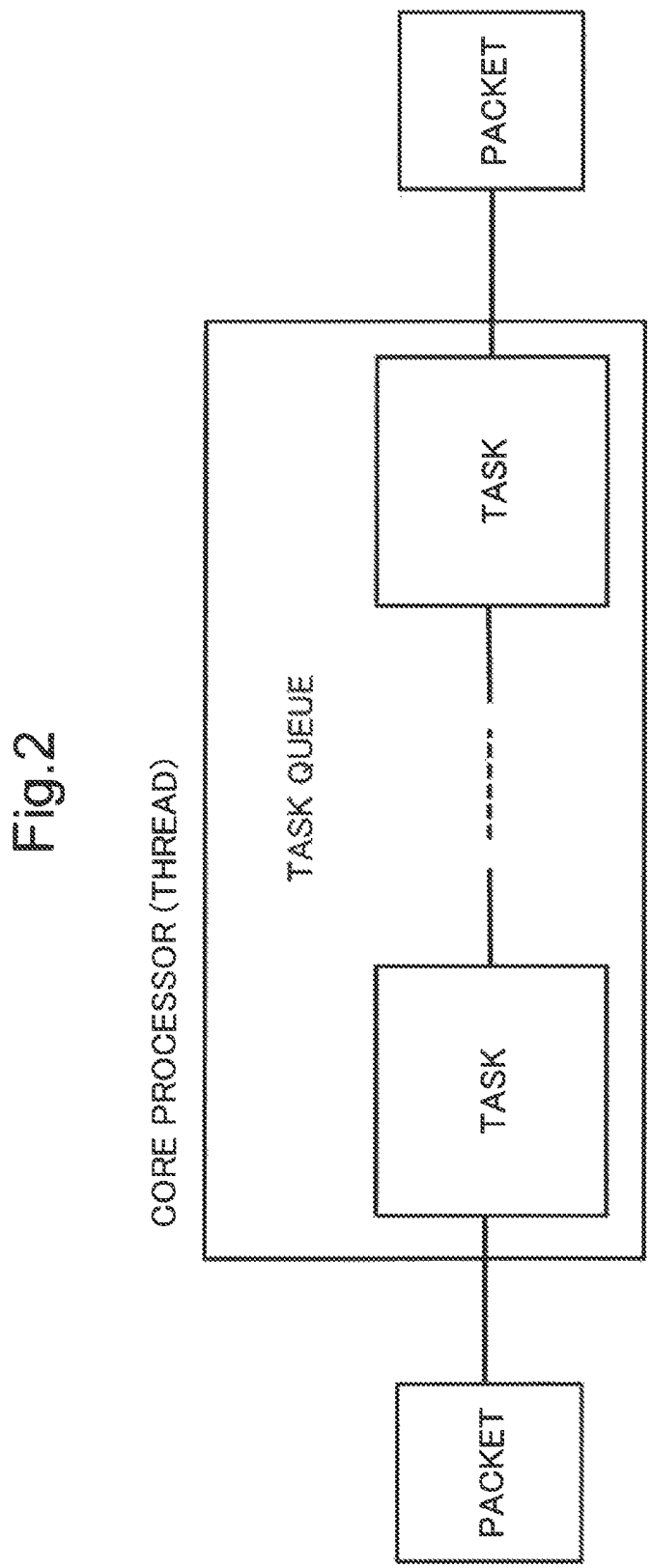
FIG. 2 is a diagram explaining a configuration of the first example embodiment.

FIG. 2 schematically illustrates a state where, in a thread (described later) to be processed by any one core processor among the core processors 1111 to 111n in FIG. 1, the packet received from the bus 1101 is sequentially processed in tasks (described later) and is returned to the bus 1101.

A program of the packet processing device of the present example embodiment is configured using a Linux (registered trademark) operating system (OS) and a software framework conforming to a data plane development kit (DPDK) on the Intel architecture processor.

The packet is sequentially processed by a plurality of minimum units of the processing, which are called tasks.

Further, an aggregation of the tasks is referred to as a thread. The thread refers to an aggregation of a series of the tasks to be processed by the core processor.

A single core processor cannot process the plurality of tasks simultaneously, and accordingly, sequentially processes the tasks in the thread. This continuous processing in which the tasks are arrayed sequentially is referred to as a task queue.

Figure 3:
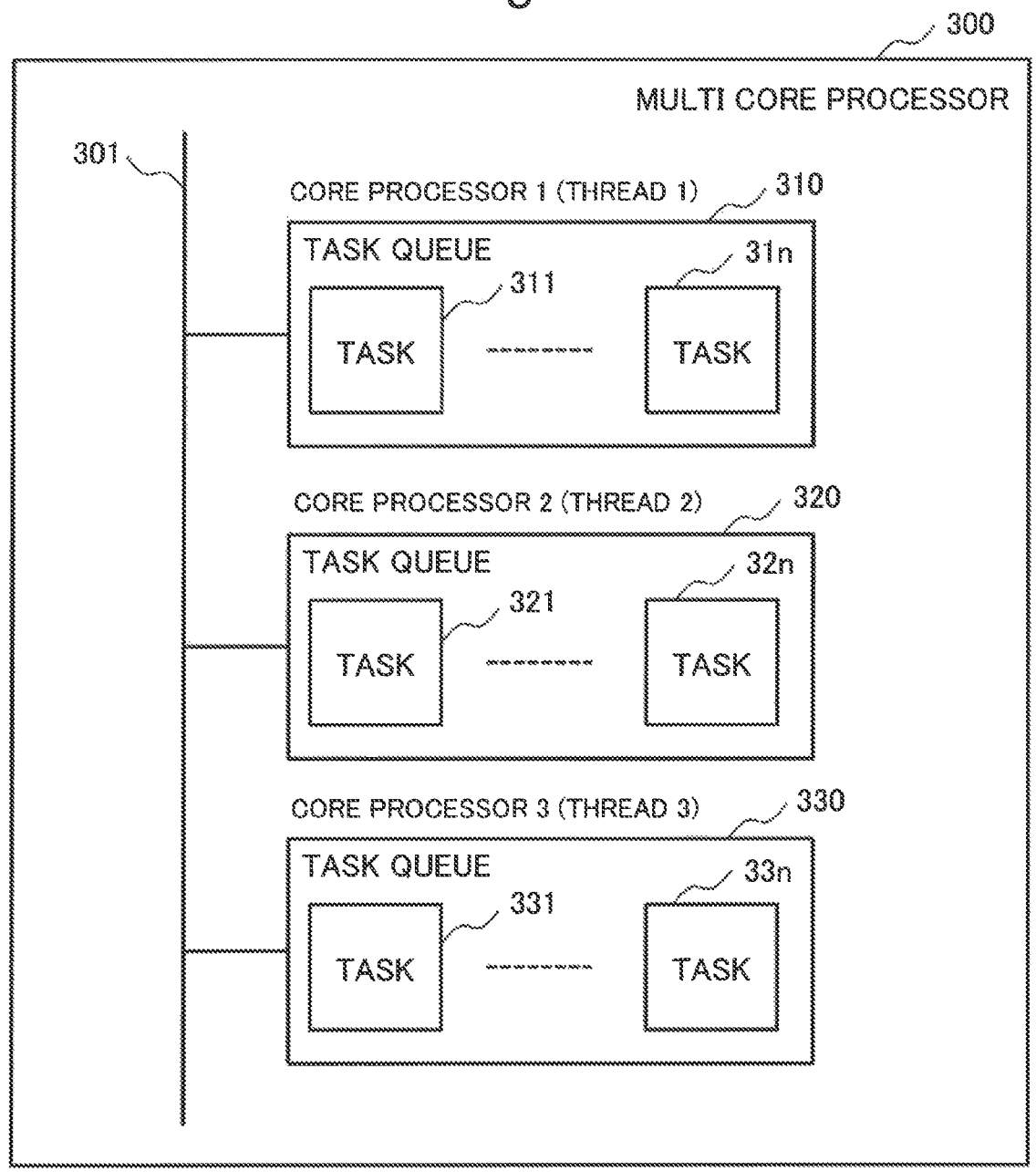
FIG. 3 is a diagram explaining the configuration of the first example embodiment.

FIG. 3 illustrates an example where three core processors 310, 320, and 330 are connected to a common bus 301 in a multi core processor 300. Then, the three processors process packets sent from the bus 301 independently of and simultaneously with one another in order of task queues of the respective threads. Note that the number of core processors to be connected to the bus 301 may be any plural number.

Next, a configuration of the task that is a constituent of the thread will be described with reference to FIG. 4.

A task 400 includes a packet reception unit 401, a rule search unit 402, a rule application unit 403, a rule table 404, and an execution history recording unit 405. Moreover, the task 400 includes one each of a unique task identifier.

The packet reception unit 401 is a means for receiving a packet sent to the task. The rule search unit 402 is a means for searching the rule table 404 for information corresponding to a packet identifier of the received packet. The rule application unit 403 is a means for executing first processing in the task 400 on the basis of the information searched for by the rule search unit 402 from the rule table 404. Further, the rule application unit 403 is a means for sending the packet together with the task identifier designating other task executing next second processing on the basis of the information of the rule table 404.

The rule table 404 is a means for storing the identifier of the received packet, the first processing to be performed in the task 400, and the task identifier designating the other task that executes the next second processing, in association with one another. The execution history recording unit 405 is a means for recording a time for processing the task as a history.

Note that, with regard to a task that does not have a task to be designated next, information on a task identifier thereof is not recorded in the rule table 404.

Moreover, depending on the task, the packet reception unit 401 may use a buffer that performs first-in first-out (FIFO) for the packet sent to the task.

Next, with reference to FIG. 5, description will be given to a configuration of a control task 500 that is a task of a thread for controlling the constituents of the task illustrated in FIG. 4. Here, it is assumed that the control task belonging to the control thread is single. Moreover, the control task 500 may also be referred to as a control unit.

Figure 4:
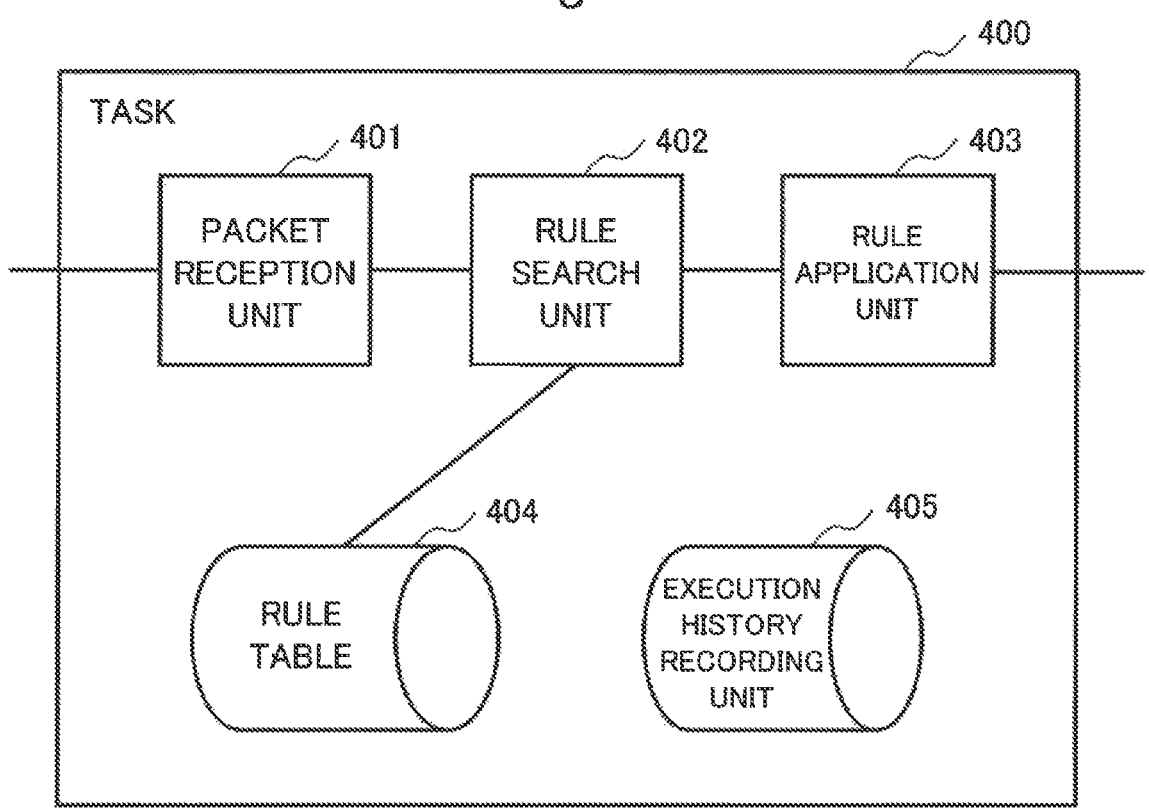
FIG. 4 is a diagram explaining the configuration of the first example embodiment.
Figure 5:
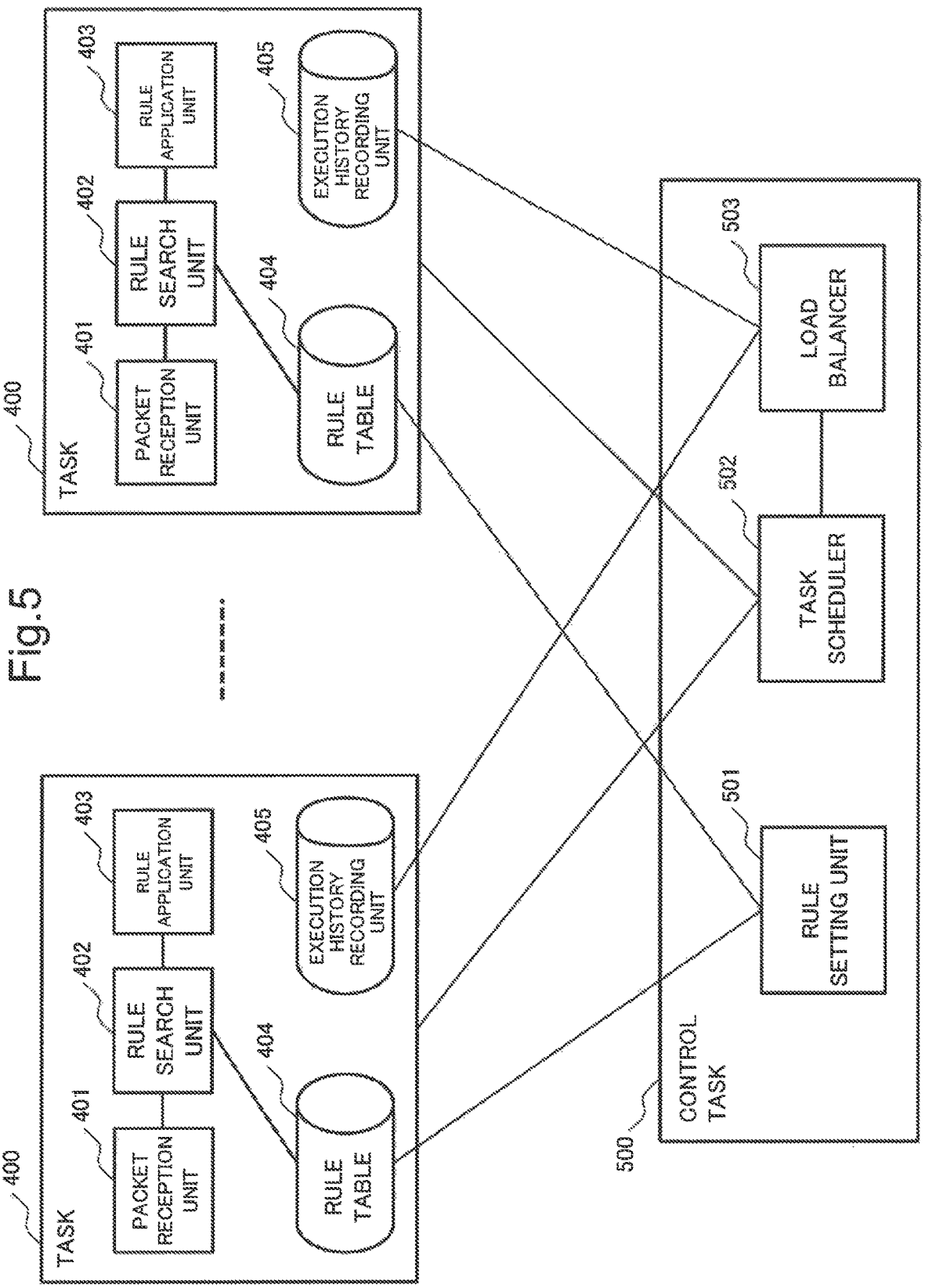
FIG. 5 is a diagram explaining the configuration of the first example embodiment.

FIG. 5 illustrates a state where a plurality of the tasks 400 illustrated in FIG. 4 is arrayed in accordance with a task queue in the thread and the control task 500 controls the plurality of tasks 400.

The control task 500 includes a rule setting unit 501, a task scheduler 502 and a load balancer 503.

The rule setting unit 501 is a means for performing addition, change, deletion and the like of a rule for the rule tables 404 of the tasks 400 according to needs.

The task scheduler 502 is a means for moving a task belonging to a task queue of a certain core processor to a task queue of another core processor.

The load balancer 503 is a means for referring to the execution history recording units 405 of the respective tasks 400 every fixed time and accumulating cycles for the respective core processors to process the tasks within the fixed time. Further, the load balancer 503 is a means for issuing an instruction for the following operation in such a way as to balance the cycles of the tasks to be processed by the respective core processors for the fixed time. This operation is to instruct the task scheduler 502 to move the task belonging to the task queue of a certain core processor to the task queue of another core processor.

Note that, in each of the tasks 400 in FIGS. 4 and 5, portions surrounded by rectangles attached with reference numerals 401 to 403 represent functions to be executed by the CPU of the core processor, and portions illustrated like cylinders attached with reference numerals 404 and 405 represent information to be recorded in a memory accompanying the core processor. Moreover, in the control task 500 in FIG. 5, portions surrounded by rectangles attached with reference numerals 501 to 503 represent functions to be executed by the CPU of the core processor.

[Description of Operations]

Next, operations of the present example embodiment will be described with reference to FIGS. 3 to 8.

Figure 6:
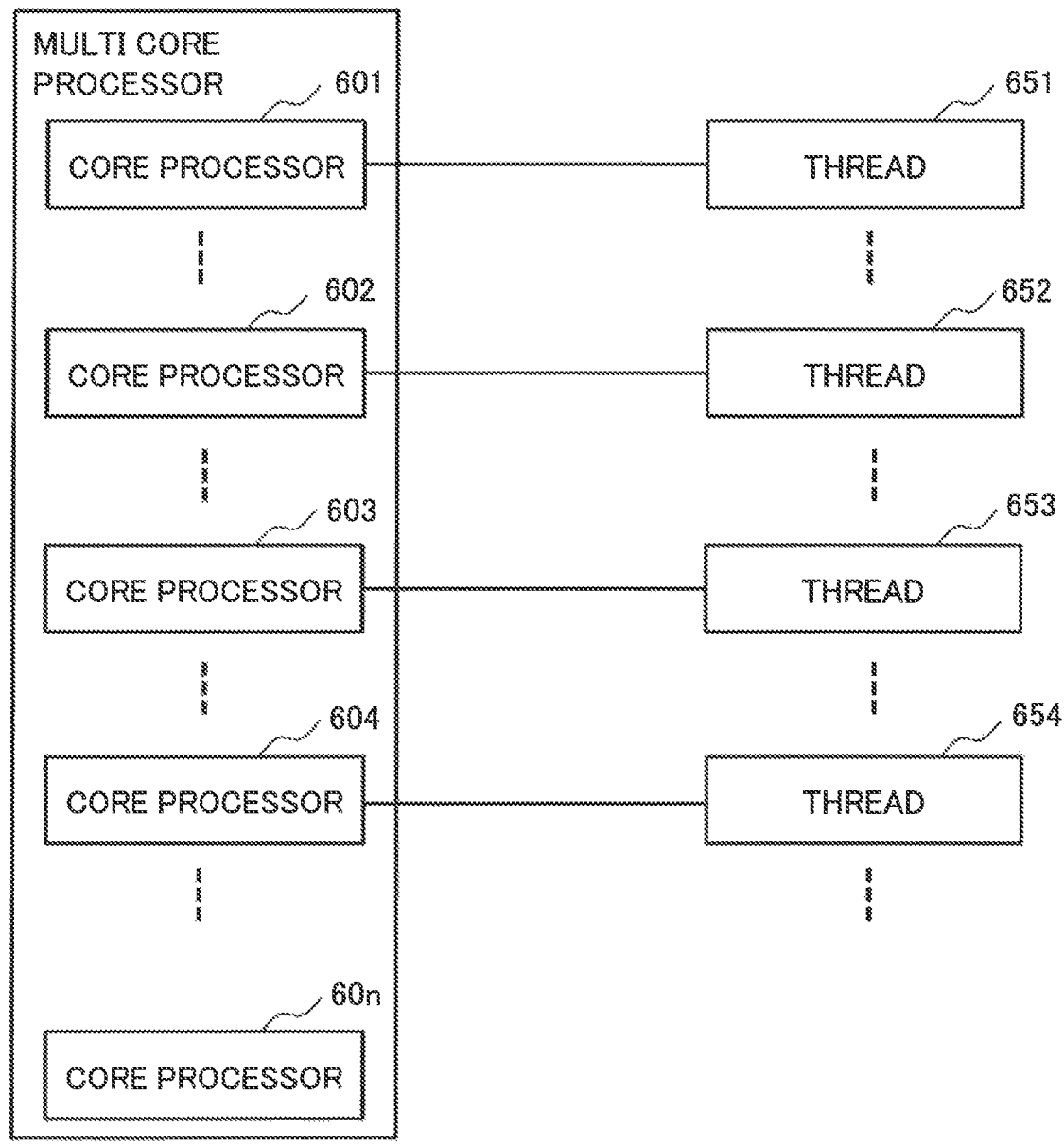
FIG. 6 is a diagram explaining operations of the first example embodiment.

First, as illustrated in FIG. 6, the threads to be processed by the core processors are assigned to the core processors one by one.

The tasks to be assigned to each thread are selected according to an arbitrary rule, and the task queue is set.

Referring to FIG. 3, the task identifier to be described later is not added to the packet received by the multi core processor 300. The packet that is not added with the task identifier is processed by a predetermined task among the tasks 311 to 31n, the tasks 321 to 32n and the tasks 331 to 33n (hereinafter, the tasks 311 and others), which are illustrated in FIG. 3.

Meanwhile, as described later, the task identifier is added to the packet processed by one or more tasks such as the task 311 and others. Then, the packet added with the task identifier is processed as a packet in any one of the tasks 311 and others illustrated in FIG. 3, the packet corresponding to the packet identifier.

Then, as mentioned above, each of the task 311 and others adopts a configuration illustrated in FIG. 4.

Referring to FIG. 4, when the packet reception unit 401 receives the packet, the rule search unit 402 refers to the rule table 404. Then, the rule search unit 402 reads the following information from the rule table 404 in FIG. 4. The information is information on a task identifier that indicates either of the first processing to be performed in the task, the first processing being associated with the packet identifier of the received packet, and the task 311 and others in FIG. 3, which are the tasks to perform the next second processing.

Further, the rule application unit 403 in FIG. 4 executes the processing read from the rule table 404 by the rule search unit 402. Then, the processed packet is added with the task identifier read by the rule search unit 402, and is sent out to the bus.

The packet sent out from any one task of the tasks 311 and others in FIG. 3 is received by the packet reception unit 401 in FIG. 4 in any task of the tasks 311 and others, any task coinciding with the task identifier added to the packet. Thereafter, the packet is processed by the tasks in a similar way to the above, and the packet is returned to the bus.

Note that some of the tasks 311 and others in FIG. 3 are frequently fixed to and associated with any one of the tasks 311 and others by routing, any one task performing the next processing. The task identifier that indicates the task to perform the second processing is not recorded in the rule table 404 in FIG. 4 in the task in that case.

Moreover, the tasks 311 and others in FIG. 3 may include a task in which the next and new second processing is not present. For example, there is a case where a task for transmission sends out the packet to the outside of the multi core processor when the processing for the packet in the task is ended. Also in such a task, the task identifier that indicates the task to perform the second processing is not recorded in the rule table 404 in FIG. 4.

The above is first operations of the packet processing device 1000.

Subsequently, operations after the above-described first operations continue for the fixed time will be described.

In the execution history recording unit 405, the task 400 illustrated in FIG. 4 records a time required to process the task concerned.

For each of the core processors, the load balancer 503 of the control task illustrated in FIG. 5 accumulates pieces of processing time for all the tasks processed by the respective core processors within the fixed time. Here, it is considered that a core processor with a long processing time within the fixed time is a core processor with a high load, and that a core processor with a short processing time within the fixed time is a core processor with a low load.

Then, in order to equalize the loads between the core processors, as illustrated in FIG. 7, a task in a task queue of the core processor with a high load is moved to a task queue of the core processor with a low load. There is known a technology capable of extracting and inserting the task in the task queue by a lock-free method such as a read copy update (RCU) method.

Note that a variety of methods are conceivable for selecting the task that is to be moved in order to equalize the loads between the core processors. However, the methods are not included in the spirit of the present invention, and are accordingly omitted.

Moreover, some tasks may be set so as not to allow to move between the task queues. For example, there are tasks which receive the packet, tasks which transmit the packet, and the like.

Next, the memory to be referred to by the core processor will be described.

A left side of FIG. 8 illustrates a state where tasks 1 to n are arranged in virtual memories, and a right side of FIG. 8 illustrates storage regions of a physical memory. Further, lines which connect the virtual memories and the physical memory represent associations between the virtual memories and the physical memory. The associations between the virtual memories and the physical memory are performed by a translation lookaside buffer (TLB) of the core processor.

The task 1 illustrated in FIG. 8 is stored in a virtual memory area 800, and in the virtual memory area 800, common information 811 and task-specific information 821 are stored. Moreover, the task n is stored in a virtual memory area 80n, and in the virtual memory area 80n, the common information 811 and task-specific information 82n are stored.

The common information 811 is information to be referred to by all the tasks, and for example, the packet and the like are stored therein. Moreover, pieces of the task-specific information 821 to 82n are pieces of information to be referred to by the tasks 1 to n respectively and specifically. Rule tables, execution history records and the like are stored in the pieces of task-specific information 821 to 82n.

In an example of FIG. 8, the common information 811 common to the tasks 1 to n is stored in an address region A of the physical memory. Moreover, the task-specific information 821 of the task 1 is stored in address regions B1 to Bm of the physical memory, and the task-specific information 82n of the task n is stored in address regions C1 to Cm of the physical memory.

In the actual packet processing device, it is frequent that processing for the same task continues. In this case, when the processing processors are assigned on a per-packet basis as in the packet processing device of PTL 2, the processing processors differ for each of the packets. Therefore, the memory regions to be indicated by the TLB of the processor differ every time when the packet is processed. Accordingly, a time of reference processing for the memory is required. Therefore, even if the processing processors are changed for each of the packets in order to equalize the loads between the plurality of processors and to shorten the packet processing time, an effect of shortening the processing time is not exerted sufficiently.

Meanwhile, in the packet processing device of the present example embodiment, the same task is processed by the same processor. Therefore, when the processing for the same task continues, the memory region to be indicated by the TLB of the processor is unchanged. Accordingly, the time of the reference processing for the memory is shortened more than in the packet processing device of PTL 2. As a result, it becomes possible to perform the packet processing at higher speed than in the packet processing device of PTL 2.

Second Example Embodiment

Next, the second example embodiment of the present invention will be described with reference to FIG. 9.

A packet processing device 900 of the present example embodiment includes: a bus 901 that transfers a communication packet including a packet identifier; and a plurality of processors 911 to 91n each of which is connected to the bus 901 and executes at least one task including either of a first task and a second task.

The first task performs predetermined processing when a first task identifier given to the first task and a second task identifier added to the communication packet received from the bus 901 coincide with each other. Moreover, the second task performs the predetermined processing for the communication packet that is not added with the second task identifier.

Then, the predetermined processing executes first processing on the basis of the packet identifier, and thereafter, adds, to the communication packet, the second task identifier indicating another task that executes second processing subsequent to the first processing, and transmits the communication packet to the bus 901.

In this way, the packet processing device 900 of the present example embodiment becomes capable of performing the packet processing at higher speed than the packet processing device of PTL 2.

The preferred example embodiments of the present invention have been described above. However, the present invention is not limited to the above-described example embodiments, and can be extended and modified as follows.

The program of the packet processing device of the first example embodiment is achieved by the Linux OS on the Intel architecture processor; however, may be achieved in a virtual OS environment. In this case, the program is operated by a processor and an OS under a virtual environment managed by the virtual machine manager (VMM).

The first processing in the first example embodiment is defined to be processing of determining whether to discard a target packet. Moreover, the second processing is defined to be processing of an upper layer for the target packet when the target packet is a packet to be received by the task.

Furthermore, the second processing may be defined to be processing of a lower layer for the target packet when the target packet is a packet to be transmitted from the task.

Moreover, the first processing in the first example embodiment is defined to be processing of determining an address of the target packet. Moreover, the second processing is defined to be processing of the upper layer for the target packet when the target packet is the packet to be received by the task. Furthermore, the second processing may be defined to be processing of the lower layer for the target packet when the target packet is the packet to be transmitted by the task.

When the rule table does not hold a rule corresponding to information stored in the target packet, the rule search unit in the first example embodiment may request the rule setting unit to set a filter adapted to the information of the target packet with regard to the rule.

The rule table in the first example embodiment may be configured to hold a plurality of rules with orders given according to priority. Further, when a plurality of rules adapted to the target packet is stored in the rule table, the rule extraction unit may extract a rule with higher priority among the plurality of rules.

The packet processing in the task of the first example embodiment may be configured so as to simultaneously execute plural pieces of packet processing by preparing a plurality of pipelines.

In the packet processing in the task of the first example embodiment, a request for the processing may be issued to a plurality of the tasks, and processing based on information of a memory reference region of a new task may be performed.

Moreover, the present invention is also applicable to a case where an information processing program that achieves the functions of the example embodiments is supplied to the system or the device directly or remotely.

Some or all of the above-described example embodiments can also be described as in the following supplementary notes; however, are not limited to the following.

(Supplementary Note 1)

A packet processing device including:

a bus that transfers a communication packet including a packet identifier; and a plurality of processors each of which is connected to the bus and executes at least one task including either of a first task and a second task, wherein the first task performs predetermined processing when a first task identifier given to the first task and a second task identifier added to the communication packet received from the bus coincide with each other, the second task performs the predetermined processing for the communication packet that is not added with the second task identifier, and the predetermined processing executes first processing based on the packet identifier, and thereafter, adds, to the communication packet, the second task identifier indicating another task that executes second processing subsequent to the first processing, and transmits the communication packet to the bus.

(Supplementary Note 2)

The packet processing device according to Supplementary note 1, wherein all the tasks are stored in physical storage regions different from one another, the physical storage regions being indicated by translation lookaside buffers (TLBs) of the plurality of processors.

(Supplementary Note 3)

The packet processing device according to Supplementary note 1 or 2, wherein each of all the tasks makes a record of a time taken to execute the task in the task, and the packet processing device further includes a task scheduler that reads out the records from all the tasks every predetermined time, acquires a total time of tasks executed for each of the plurality of processors within the predetermined time, and moves at least one task in a processor with the long total time to a processor with the short total time.

(Supplementary Note 4)

The packet processing device according to any one of Supplementary notes 1 to 3, wherein the first processing is processing of determining whether to discard the communication packet, and the second processing is processing of an upper layer for the communication packet when the communication packet is a communication packet to be received by the task and is processing of a lower layer for the communication packet when the communication packet is a communication packet to be transmitted by the task.

(Supplementary Note 5)

The packet processing device according to any one of Supplementary notes 1 to 3, wherein the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

(Supplementary Note 6)

A packet processing method including causing a plurality of processors connected to a bus that transfers a communication packet including a packet identifier to execute at least one task including either of a first task and a second task, wherein the first task performs predetermined processing when a first task identifier given to the first task and a second task identifier added to the communication packet received from the bus coincide with each other, the second task performs the predetermined processing for the communication packet that is not added with the second task identifier, and the predetermined processing executes first processing based on the packet identifier, and thereafter, adds, to the communication packet, the second task identifier indicating another task that executes second processing subsequent to the first processing, and transmits the communication packet to the bus.

(Supplementary Note 7)

The packet processing method according to Supplementary note 6, wherein all the tasks are stored in physical storage regions different from one another, the physical storage regions being indicated by translation lookaside buffers (TLBs) of the plurality of processors.

(Supplementary Note 8)

The packet processing method according to Supplementary note 6 or 7, wherein each of all the tasks makes a record of a time taken to execute the task in the task, and the records are read out from all the tasks every predetermined time, a total time of tasks executed for each of the plurality of processors within the predetermined time is acquired, and at least one task in a processor with the long total time is moved to a processor with the short total time.

(Supplementary Note 9)

The packet processing method according to any one of Supplementary notes 6 to 8, wherein the first processing is processing of determining whether to discard the communication packet, and the second processing is processing of an upper layer for the communication packet when the communication packet is a communication packet to be received by the task and is processing of a lower layer for the communication packet when the communication packet is a communication packet to be transmitted by the task.

(Supplementary Note 10)

The packet processing method according to any one of Supplementary notes 6 to 8, wherein the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

(Supplementary Note 11)

A program causing a plurality of processors connected to a bus that transfers a communication packet including a packet identifier to execute at least one task including either of a first task and a second task, wherein the first task performs predetermined processing when a first task identifier given to the first task and a second task identifier added to the communication packet received from the bus coincide with each other, the second task performs the predetermined processing for the communication packet that is not added with the second task identifier, and the predetermined processing executes first processing based on the packet identifier, and thereafter, adds, to the communication packet, the second task identifier indicating another task that executes second processing subsequent to the first processing, and transmits the communication packet to the bus.

(Supplementary Note 12)

The program according to Supplementary note 11, wherein all the tasks are stored in physical storage regions different from one another, the physical storage regions being indicated by translation lookaside buffers (TLBs) of the plurality of processors.

(Supplementary Note 13)

The program according to Supplementary note 11 or 12, wherein each of all the tasks makes a record of a time taken to execute the task in the task, and the records are read out from all the tasks every predetermined time, a total time of tasks executed for each of the plurality of processors within the predetermined time is acquired, and at least one task in a processor with the long total time is moved to a processor with the short total time.

(Supplementary Note 14)

The program according to any one of Supplementary notes 11 to 13, wherein the first processing is processing of determining whether to discard the communication packet, and the second processing is processing of an upper layer for the communication packet when the communication packet is a communication packet to be received by the task and is processing of a lower layer for the communication packet when the communication packet is a communication packet to be transmitted by the task.

(Supplementary Note 15)

The program according to any one of Supplementary notes 11 to 13, wherein the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

The present invention has been made above while taking the above-mentioned example embodiments as typical examples. However, the present invention is not limited to the above-mentioned example embodiments. That is to say, a variety of modes understandable by those skilled in the art can be applied to the present invention within the scope of the present invention.

This application claims priority based upon Japanese Patent Application No. 2016-114381 filed on Jun. 8, 2016, the entire disclosure of which is incorporated herein by reference.

REFERENCE SIGNS LIST

300 Multi core processor
301 Bus
310 Core processor
311, 31n Task
320 Core processor
321, 32n Task
331, 33n Task
400 Task
401 Packet reception unit
402 Rule search unit
403 Rule application unit
404 Rule table
405 Execution history recording unit
500 Control task
501 Rule setting unit
502 Task scheduler
503 Load balancer
800, 80n Virtual memory area
811 Common information
821, 82n Task-specific information
900 Packet processing device
901 Bus
911, 91n Processor
1000 Packet processing device
1100 Multi core processor
1101 Bus
1111, 111n Core processor
1200 Control unit

What is claimed is:

1. A packet processing device comprising:
a bus that transfers a communication packet including a packet identifier; and
a plurality of processors each of which is connected to the bus and executes at least one task including either of a first task and a second task, wherein
the first task performs predetermined processing when a first task identifier given to the first task and a second task identifier added to the communication packet received from the bus coincide with each other,
the second task adds the second task identifier to the communication packet and performs the predetermined processing for the communication packet that is not added with the second task identifier, and
the predetermined processing executes first processing, based on the packet identifier, and thereafter, transmits, to the bus, the communication packet that is added with the second task identifier indicating the different first task that executes second processing subsequent to the first processing.

2. The packet processing device according to claim 1, wherein
all the tasks are stored in physical storage regions different from one another, the physical storage regions being indicated by translation lookaside buffers (TLBs) of the plurality of processors.

3. The packet processing device according to claim 1, wherein
each of all the tasks makes a record of a time taken to execute the task, in the task, and
the packet processing device further comprises a task scheduler that reads out the records from all the tasks every predetermined time, acquires a total time of tasks executed for each of the plurality of processors within the predetermined time, and moves at least one task in a processor with the long total time to a processor with the short total time.

4. The packet processing device according to claim 1, wherein
the first processing is processing of determining whether or not to discard the communication packet, and the second processing is processing of an upper layer for the communication packet when the communication packet is a communication packet to be received by the task and is processing of a lower layer for the communication packet when the communication packet is a communication packet to be transmitted by the task.

5. The packet processing device according to claim 1, wherein
the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

6. A packet processing method comprising
causing a plurality of processors connected to a bus that transfers a communication packet including a packet identifier, to execute at least one task including either of a first task and a second task, wherein
the first task performs predetermined processing when a first task identifier given to the first task and a second task identifier added to the communication packet received from the bus coincide with each other,
the second task adds the second task identifier to the communication packet and performs the predetermined processing for the communication packet that is not added with the second task identifier, and
the predetermined processing executes first processing, based on the packet identifier, and thereafter, transmits, to the bus, the communication packet that is added with the second task identifier indicating the different first task that executes second processing subsequent to the first processing.

7. The packet processing method according to claim 6, wherein
all the tasks are stored in physical storage regions different from one another, the physical storage regions being indicated by translation lookaside buffers (TLBs) of the plurality of processors.

8. The packet processing method according to claim 6, wherein
- each of all the tasks makes a record of a time taken to execute the task, in the task, and
- the records are read out from all the tasks every predetermined time, a total time of tasks executed for each of the plurality of processors within the predetermined time is acquired, and at least one task in a processor with the long total time is moved to a processor with the short total time.

9. The packet processing method according to claim 6, wherein
- the first processing is processing of determining whether or not to discard the communication packet, and the second processing is processing of an upper layer for the communication packet when the communication packet is a communication packet to be received by the task and is processing of a lower layer for the communication packet when the communication packet is a communication packet to be transmitted by the task.

10. The packet processing method according to claim 6, wherein
- the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

11. A non-transitory recording medium that records a program causing a plurality of processors connected to a bus that transfers a communication packet including a packet identifier, to execute at least one task including either of a first task and a second task, wherein
- the first task performs predetermined processing when a first task identifier given to the first task and a second task identifier added to the communication packet received from the bus coincide with each other,
- the second task adds the second task identifier to the communication packet and performs the predetermined processing for the communication packet that is not added with the second task identifier, and
- the predetermined processing executes first processing, based on the packet identifier, and thereafter, transmits, to the bus, the communication packet that is added with the second task identifier indicating the different first task that executes second processing subsequent to the first processing.

12. The non-transitory recording medium according to claim 11 that records the program, wherein
- all the tasks are stored in physical storage regions different from one another, the physical storage regions being indicated by translation lookaside buffers (TLBs) of the plurality of processors.

13. The non-transitory recording medium according to claim 11 that records the program, wherein
- each of all the tasks makes a record of a time taken to execute the task, in the task, and
- the records are read out from all the tasks every predetermined time, a total time of tasks executed for each of the plurality of processors within the predetermined time is acquired, and at least one task in a processor with the long total time is moved to a processor with the short total time.

14. The non-transitory recording medium according to claim 11 that records the program, wherein
- the first processing is processing of determining whether or not to discard the communication packet, and the second processing is processing of an upper layer for the communication packet when the communication packet is a communication packet to be received by the task and is processing of a lower layer for the communication packet when the communication packet is a communication packet to be transmitted by the task.

15. The non-transitory recording medium according to claim 11 that records the program, wherein
- the first processing is processing of determining an address of the communication packet, and the second processing is processing of an upper layer for the communication packet when the communication packet is a communication packet to be received by the task and is processing of a lower layer for the communication packet when the communication packet is a communication packet to be transmitted by the task.

* * * * *